United States Patent [19]
Sylvester

[11] 3,889,536
[45] June 17, 1975

[54] FLOW MEASURING AND MONITORING APPARATUS

[75] Inventor: Gordon C. Sylvester, Verona, Wis.

[73] Assignee: Wehr Corporation, Milwaukee, Wis.

[22] Filed: Mar. 29, 1973

[21] Appl. No.: 345,864

[52] U.S. Cl. ................................. 73/212; 73/213
[51] Int. Cl. ............................................ G01f 1/00
[58] Field of Search.......... 73/205 R, 212, 213, 182; 138/44

[56] References Cited
UNITED STATES PATENTS

| | | | |
|---|---|---|---|
| 1,087,929 | 2/1914 | Dodge | 73/212 X |
| 1,311,798 | 7/1919 | Bristol | 73/182 X |
| 3,667,494 | 6/1972 | Haase | 73/213 X |
| 3,751,982 | 8/1973 | Lambert | 73/212 |

FOREIGN PATENTS OR APPLICATIONS

| | | | |
|---|---|---|---|
| 471,421 | 2/1951 | Canada | 73/212 |

Primary Examiner—Jerry W. Myracle
Assistant Examiner—John P. Beauchamp

[57] ABSTRACT

A restricted passage, in the form of a venturi tube, is provided in the path of a medium flowing through a confined, larger passage. A pressure sensing tap in the throat of the venturi tube and a second tap in the larger passage remote from the venturi tube are connected to provide a comparison of the pressures at the two taps. The taps are connected to a gage for providing a visual readout of the pressure difference or, in the alternative, the pressure sensing taps are connected to a control device which functions on the basis of that pressure differential. To amplify the pressure differential, an obstruction is provided in the passage adjacent to the upstream end and/or the downstream end of the venturi tube.

4 Claims, 6 Drawing Figures

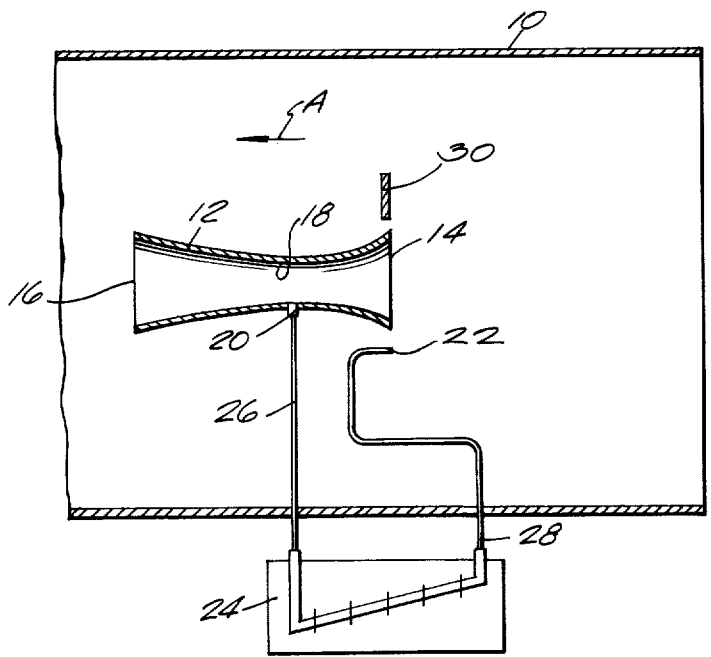
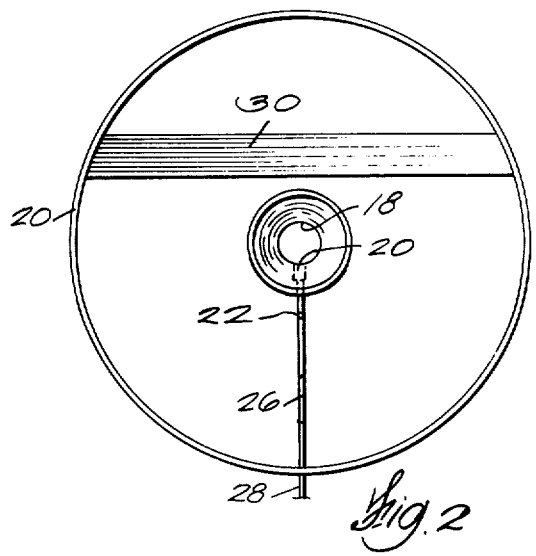
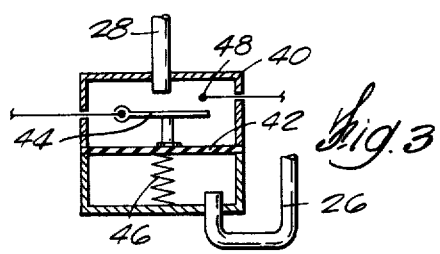
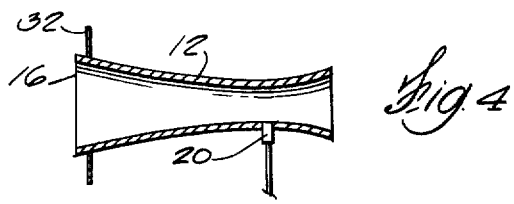
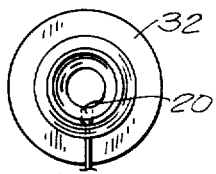
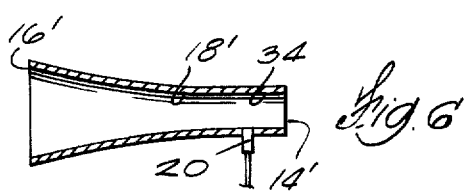

FLOW MEASURING AND MONITORING APPARATUS

BACKGROUND OF INVENTION

This invention relates to arrangements for measuring the conditions of pressure and/or velocity of flow in a passage and/or accomplishing a control function on the basis of those conditions.

Various arrangements have been proposed in the past to measure the flow in a passage such as a duct in an air distribution system. For example, pitot tubes have been used but have not been entirely satisfactory in that they are not reliable, particularly at relatively low flow velocities. Venturi tube arrangements have also been proposed in the past but, again, have not been entirely satisfactory.

Among the general objects of this invention is to provide an arrangement for either accurately measuring conditions of flow in a passage or accomplishing a control function on the basis of those conditions, or both.

SUMMARY OF INVENTION

For the achievement of these and other objects, this invention proposes an arrangement wherein a restricted flow passage, preferably in the form of a venturi tube, is provided in the path of a flowing medium. A static pressure sensing tap is provided in the restricted flow passage, e.g., at the throat of the venturi, and a total pressure sensing tap is provided in the path of the flowing medium adjacent to the restricted flow passage but spaced from the first mentioned tap. The condition of the flowing medium (e.g., pressure, velocity) is determined by comparing the conditions sensed by the two taps. For example, both taps are connected to a gage for providing a visual readout based on the difference in the pressures in the restricted passage and that in the main body of the flowing medium. In the alternative, the taps are connected to a pressure sensitive control device, for example a pressure operated relay, to achieve a control function on the basis of the sensed pressure differential.

The venturi arrangement amplifies the differential pressure condition by reducing the pressure at one of the taps which is used as one of the measuring or control parameters. To achieve a still further amplification, an additional restriction, or obstruction, is provided in the flow path adjacent the upstream end and/or the downstream end of the venturi tube.

Other objects and advantages will be pointed out in, or be apparent from, the specification and claims, as will obvious modifications of the embodiments shown in the drawings, in which:

FIG. 1 is a generally schematic illustration of a venturi arrangement mounted within an enclosed passage and connected to a pressure gage.

FIG. 2 is an end view of the arrangement of FIG. 1.

FIG. 3 is a generally schematic illustration of a type of control device which can be operated by the arrangement illustrated in FIG. 1.

FIG. 4 illustrates an alternative venturi arrangement.

FIG. 5 is an end view of the venturi arrangement of FIG. 4.

FIG. 6 is a section view of still another form of restricted passage.

DESCRIPTION OF PREFERRED EMBODIMENT

This invention will now be described with particular reference to the drawings. Before entering into the description, it will be noted that the invention can be used in connection with either a flowing liquid or gaseous medium but, for convenience, it will be described as though incorporated in an air circulating system wherein it would be monitoring the flow of air in the system duct work.

A section of generally circular air distribution duct 10 is shown in FIGS. 1 and 2. In a conventional air distribution system, means is provided for influencing a flow of air through the duct in the direction of arrow A in FIG. 1. Since the details of the air moving system are not necessary to an understanding of this invention, they will not be shown or described.

A restricted flow passage is provided in duct 10 and through which a portion of the air flowing in the duct must pass. As illustrated the flow passage is a venturi tube 12 and, in accordance with conventional venturi construction, includes an upstream end 14, a downstream end 16 and a throat area 18, having a generally reduced diameter as compared to the inlet and outlet ends. Venturi tube 12 is positioned with its longitudinal axis extending generally parallel to the direction of flow through duct 10, i.e., arrow A. As can be seen in FIG. 2, the venturi tube is located generally in the center of duct 10.

A static pressure sensing tap 20 is located in throat area 18. A second, total pressure sensing tap 22 is provided in duct 10 adjacent to venturi 12 but spaced from tap 20.

As illustrated in FIG. 1, pressure sensing taps 20 and 22 are connected to a pressure gage, water gage 24, by conduits 26 and 28. A water gage is shown for illustrative purposes but it will be appreciated any other conventional pressure type gage can be utilized.

As is conventional with respect to a venturi tube, the air flowing into upstream end 14 will be accelerated at throat area 18 producing a reduced static pressure in that area, sensed by tap 20, as compared to the total pressure in the duct, sensed by tap 22. That is, the use of the venturi provides an amplified signal by reducing the pressure condition sensed at throat area 18. The duct total pressure is sensed by tap 22 and since the venturi throat tap 20 and tap 22 are connected to the gage, the gage will give a visual readout based on the difference in pressure in the venturi tube and that in the duct work. This pressure reading can be used to determine the volume of air flowing through the duct. The comparison of the venturi pressure with the internal pressure of the duct provides a reliable basis for monitoring flow and will be accurate even in the case of relatively low air velocities in duct 10, that is, more accurate as compared to arrangements such as pitot tubes and the like. The comparison reading as opposed to a velocity pressure reading in the duct provides an accurate flow monitoring system throughout a wider range of flow velocities.

In order to achieve a still further amplification of the pressure differential, this invention also proposes to provide an obstruction in the flow path adjacent venturi 12, or the restricted passage in general, which increases the pressure drop across the venturi. For example, as illustrated in FIGS. 1 and 2, the obstruction takes the form of an elongated strip 30 extending between opposed areas on the inner walls of duct 10. Strip 30 is positioned adjacent upstream end 14 of the venturi and increases the static pressure in duct 10 on the upstream end of the venturi so that a greater pressure drop is experienced between the upstream and downstream ends of the venturi achieving a lower static pressure at sensing tap 20 than will be experienced without strip 30.

The obstruction can also take the form of an annular flange 32 connected to the outer wall of venturi 12 adjacent downstream end 16 as viewed in FIG. 4. In this arrangement, flange 32 reduces the static pressure in the duct behind the flange or at the downstream end of the venturi. This again produces a lower static pressure at the venturi throat thereby further amplifying the pressure differential which is produced by the pressure sensing taps 20 and 22.

It is contemplated that both the constructions in the form of strip 30 and flange 32 can be used in a single application thereby further maximizing the signal produced by the venturi arrangement.

FIG. 6 illustrates yet another means of providing a restricted passage in the main duct. In this instance the restricted passage has a generally uniform cylindrical cross-section entrance extension 34 up to a throat 18' and flares outwardly to a downstream end 16'. This provides a restricted passage and, similar to a venturi arrangement, achieves a reduced static pressure condition at throat 18' as compared to the main duct total pressure. In addition, as compared to the prior described venturi with its outwardly flared inlet, the configuration of FIG. 6 also obstructs flow into the passage which has the effect of increasing the static pressure on the upstream end of the venturi and ultimately a lower pressure at sensing tap 20, similar in effect to the provision of strip 30 or flange 32. It is also contemplated that the configuration of FIG. 6 can be used with either the flange 32, the strip 30, or both.

FIG. 3 illustrates a type of control device which can be used to provide a direct control function in response to the signal representative of the pressure differential sensed by taps 20 and 22. In this arrangement, conduits 26 and 28 are connected to a pneumatic relay 40. The relay is of conventional construction, including a flexible diaphragm 42, connected to a movable switch blade 44. The diaphragm and switch blade are biased in one direction by spring 46, i.e. the spring blade being biased into engagement with normally closed switch contact 48. The pressure on the underside of diaphragm 42 corresponds to the restricted passage pressure, the venturi throat, whereas the pressure on the upperside corresponds to that in the duct and as the pressure differential increases the force of spring 46 will be overcome moving the diaphragm 42 downwardly and carrying with it switch blade 44 to open the circuit through normally closed contact 48. The opening and closing of the switch can be utilized to provide a control function, for example to control the mechanism influencing air flow there through duct 10 while utilizing the flow velocity, or correspondingly the pressure in the duct, as a basic control parameter. It will be appreciated that the pneumatic relay and the specific form of relay, are only included for illustrative purposes and other forms of controls can be utilized as desired.

Although specific embodiments of the present invention have been illustrated and described, it will be apparent to those skilled in the art that various changes and modifications may be made therein without departing from the spirit of the invention or from the scope of the appended claims.

I claim:

1. In combination
   means defining a main flow passage,
   walls defining a restricted passage in said main flow passage having a longitudinal axis extending generally parallel to the direction of flow through said passage, the outer surfaces of said walls being exposed directly to the interior of said main flow passage and said restricted passage characterized by upstream and downstream ends exposed directly to the interior of said main flow passage, a reduced diameter throat area spaced inwardly from said downstream end, and said walls flaring outwardly from said throat area to said downstream end,
   means defining a first pressure sensing tap in said restricted passage at said throat area so that the pressure sensed by said first tap corresponds to the pressure condition at said throat area,
   means defining a second pressure sensing tap in said main flow passage spaced from said restricted passage so that the pressure sensed by said second tap corresponds to the total pressure condition in said flow passage,
   output means operable in response to pressure differential,
   conduits connecting said first and second taps to said output means so that said output means operates in response to the pressure differential sensed by said first and second taps as a medium flows through said passage,
   and an annular flange attached to said walls defining said restricted passage and projecting laterally therefrom, said annular flange being located, with reference to flow through said main flow passage, adjacent at least one of said upstream and downstream ends of said restricted passage to amplify the pressure differential sensed by said first and second taps.

2. The combination of claim 1 wherein said restricted passage is in the form of a venturi tube having said upstream end, said downstream end, and said throat area intermediate said ends.

3. In combination
   means defining a main flow passage,
   walls defining a restricted passage in said main flow passage having a longitudinal axis extending generally parallel to the direction of flow through said passage, the outer surfaces of said walls being exposed directly to the interior of said main flow passage and said restricted passage characterized by upstream and downstream ends exposed directly to the interior of said main flow passage, a reduced diameter throat area spaced inwardly from said downstream end, and said walls flaring outwardly from said throat area to said downstream end,
   means defining a first pressure sensing tap in said restricted passage at said throat area so that the pressure sensed by said first tap corresponds to the pressure condition at said throat area,
   means defining a second pressure sensing tap in said main flow passage spaced from said restricted passage so that the pressure sensed by said second tap corresponds to the total pressure condition in said flow passage,
   output means operable in response to pressure differential, conduits connecting said first and second taps to said output means so that said output means operates in response to the pressure differential sensed by said first and second taps as a medium flows through said passage, and an elongated strip extending between opposed areas on the interior walls of said main flow passage and located, with reference to flow through said main flow passage, adjacent at least one of said upstream and downstream ends of said restricted passage to amplify the pressure differential sensed by said first and second taps.

4. The combination of claim 3 wherein said restricted passage is in the form of a venturi tube having said upstream end, said downstream end, and said throat area intermediate said ends.

* * * * *